United States Patent
Chaidaroon et al.

(10) Patent No.: US 11,682,060 B2
(45) Date of Patent: Jun. 20, 2023

(54) METHODS AND APPARATUSES FOR PROVIDING SEARCH RESULTS USING EMBEDDING-BASED RETRIEVAL

(71) Applicant: Walmart Apollo, LLC, Bentonville, AR (US)

(72) Inventors: Suthee Chaidaroon, Sunnyvale, CA (US); Feng Liu, Sunnyvale, CA (US); Min Xie, Santa Clara, CA (US); Alessandro Magnani, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/163,382

(22) Filed: Jan. 30, 2021

(65) Prior Publication Data

US 2022/0245706 A1    Aug. 4, 2022

(51) Int. Cl.
  *G06Q 30/0601* (2023.01)
  *G06F 16/9535* (2019.01)
  *G06N 20/00* (2019.01)
  *G06F 16/9538* (2019.01)
  *G06F 16/2457* (2019.01)

(52) U.S. Cl.
  CPC ... *G06Q 30/0631* (2013.01); *G06F 16/24578* (2019.01); *G06F 16/9535* (2019.01); *G06F 16/9538* (2019.01); *G06N 20/00* (2019.01); *G06Q 30/0633* (2013.01)

(58) Field of Classification Search
  CPC .......... G06F 16/9535; G06F 16/24578; G06F 16/9538; G06Q 30/06333; G06Q 30/0631; G06N 20/00

USPC .......................................................... 707/706
  See application file for complete search history.

(56) References Cited

U.S. PATENT DOCUMENTS

| | | | |
|---|---|---|---|
| 9,558,222 B1* | 1/2017 | Darby | G06F 16/438 |
| 11,238,516 B1* | 2/2022 | McAllister | G06F 16/24578 |
| 11,244,244 B1* | 2/2022 | Delgado | G06N 20/00 |
| 2010/0306249 A1* | 12/2010 | Hill | G06F 16/9535 |
| | | | 707/769 |
| 2016/0224683 A1* | 8/2016 | Hicks | G06F 16/211 |
| 2019/0005313 A1* | 1/2019 | Vemulapalli | G06V 40/174 |
| 2019/0179962 A1* | 6/2019 | Khan | G06F 16/24578 |

(Continued)

OTHER PUBLICATIONS

Alex Egg, Search Query expansion with query embeddings, Grubhub Bytes, 2019, all pages. (Year: 2019).*

(Continued)

*Primary Examiner* — James Trujillo
*Assistant Examiner* — Antonio J Caiado
(74) *Attorney, Agent, or Firm* — Morgan, Lewis & Bockius LLP; Manita Rawat

(57) ABSTRACT

A system for retrieving products in response to a customer query includes a computing device configured to obtain query information characterizing a query initiated by the customer on an ecommerce marketplace and to determine embedding-based search results comprising a first list of items. The computing device is also configured to obtain legacy search results comprising a second list of items and to blend the embedding-based search results with the legacy search results to obtain blended search results. The computing device is also configured to send the blended search results to the customer.

16 Claims, 10 Drawing Sheets

(56) References Cited

U.S. PATENT DOCUMENTS

2020/0004835 A1* 1/2020 Ramanath ........... G06F 16/9535
2021/0109966 A1* 4/2021 Ayush ................... G06N 3/088
2022/0012297 A1* 1/2022 Basu ................... G06F 16/9538

OTHER PUBLICATIONS

Eugeneyan, Query Matching via Lexical, Graph, and Embedding Methods, 2021, all pages. (Year: 2021).*
Huang, Po-Sen et al. "Learning Deep Structured Semantic Models for Web Search using Clickthrough Data", CIKM'13, Oct. 27-Nov. 1, 2013, San Francisco, CA, 8 pages.
Mitra, Bhaskar et al., "Learning to Match Using Local and Distributed Representations of Text for Web Search", arXiv:1610.08136v1, Oct. 26, 2016, 9 pages.
Zhang, Han et al., "Towards Personalized and Semantic Retrieval: An End-to-End Solution for E-commerce Search via Embedding Learning", arXiv:2006.02282v3, Jun. 5, 2020, 10 pages.
Grid Dynamics Holdings, Inc. "Semantics Vector Search", 5 pages.

* cited by examiner

METHODS AND APPARATUSES FOR PROVIDING SEARCH RESULTS USING EMBEDDING-BASED RETRIEVAL

TECHNICAL FIELD

The disclosure relates generally to methods and apparatuses for providing search results using embedding-based retrieval. More particularly, the disclosure relates to methods and apparatuses for providing search results to a customer of an ecommerce marketplace using embedding-based retrieval.

BACKGROUND

Many online or computer-based catalogs of items that are available on an ecommerce marketplace allow the user to search the contents of the catalog of items to identify item or products that are of interest to the user. In response to a query by the user, the ecommerce marketplaces can return search results. Various methods and apparatuses can be used to determine which items from the catalog are relevant to the query that is submitted by the user. It is desirable to provide the most relevant search results to the user to encourage the user to purchase items that are available on the ecommerce marketplace. When the relevancy of the search results increases, customer satisfaction can increase, revenues can increase and customer loyalty can increase.

Existing methods and apparatuses to provide search results in response to user's query have many drawbacks. Existing methods and apparatuses, for example, can often deliver search results that have low relevancy to the user's query. Many existing methods and apparatuses are resource and data intensive such that they cannot be easily scaled to be useful for commercial implementation. In addition, many ecommerce operators have existing platforms and search tools on their legacy systems and many existing methods and apparatuses cannot be implemented without significant disruption to existing operations. Therefore, there exists a need for improved methods and apparatuses for delivering relevant search results in response to users' queries that can deliver improved relevancy, are less resource and data intensive that existing methods and can be implemented into legacy systems and platforms without significant disruption.

SUMMARY

The embodiments described herein are directed to methods and apparatuses for retrieving products in response to a customer's query on an ecommerce marketplace. The embodiments described herein can be implemented using one or more computing devices that can include operative elements that can determine embedding-based search results that can determine a relevancy of various items that may be available on the ecommerce marketplace to the query of the customer. The embedding-based search results can be determined using a trained embedding-based machine learning model that can be trained using user-items pairs and using product features. The methods and the apparatuses of the present disclosure can be used in combination with existing or legacy retrieval systems and then blend the results of the embedding-based retrieval system with the legacy retrieval system. The methods and apparatuses of the present disclosure deliver improved results over existing systems by delivering items with a higher probability of relevancy to the customer's query.

In accordance with various embodiments, exemplary systems may be implemented in any suitable hardware or hardware and software, such as in any suitable computing device. For example, in some embodiments, an embedding-based retrieval system can include a computing device configured to a computing device configured to obtain query information characterizing a query initiated by a customer on an ecommerce marketplace and to determine embedding-based search results comprising a first list of items. The computing device can also be configured to obtain legacy search results comprising a second list of items and to blend the embedding-based search results with the legacy search results to obtain blended search results. The computing device can also send the blended search results to the customer.

In one aspect, the computing device can determine the embedding-based search results using a trained embedding-based machine learning model.

In another aspect, the trained embedding-based machine learning model can be trained using a similarity loss function and a product feature loss function.

In another aspect, the blended search results can be blended using one or more blending criteria that characterizes engagement by customers with the items in the first list of items.

In another aspect, a relative position of the items in the first list of items relative to the items in the second list of items in the blended search results can be determined by comparing an engagement of the customer with each item in a recent time period with an engagement of the customer with each item prior to the recent time period.

In another aspect, the computing device can be operated in parallel with a legacy retrieval system that is configured to return the legacy search results.

In another aspect, the embedding-based machine learning model can be trained using a training method comprising obtaining query-item pair data comprising a queries and item titles and tokenizing the queries and the item titles in the query-item pair data. The training method can also include labelling each query-item pair in the query-item pair data using an engagement score and training the embedding-based machine learning model using a similarity loss function and a product feature loss function.

In other embodiments of the present disclosure a method for providing embedding-based search results is provided. In one embodiment, a method can include obtaining query information characterizing a query initiated by a customer on an ecommerce marketplace and determining embedding-based search results comprising a first list of items. The method can also include obtaining legacy search results comprising a second list of items and blending the embedding-based search results with the legacy search results to obtain blended search results. The method can also include sending the blended search results to the customer.

In other embodiments in accordance with the present disclosure, a non-transitory computer readable medium is provided. In some embodiments, the non-transitory computer readable medium can have instructions stored thereon, wherein the instructions, when executed by at least one processor, can cause a device to perform operations that include obtaining query information characterizing a query initiated by a customer on an ecommerce marketplace and determining embedding-based search results comprising a first list of items. The operations can also include obtaining legacy search results comprising a second list of items and blending the embedding-based search results with the legacy search results to obtain blended search results. The operations can also include sending the blended search results to the customer.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
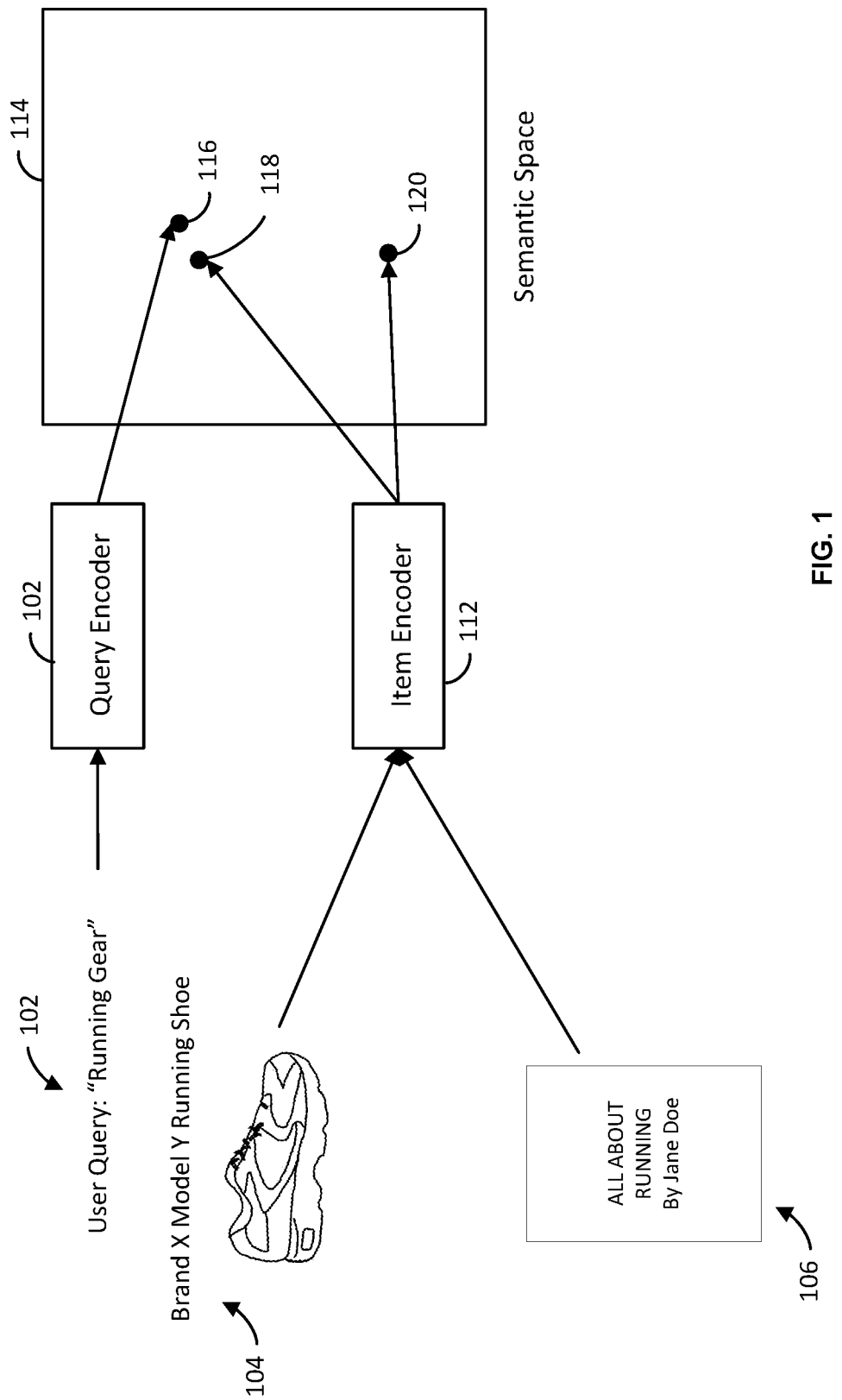
FIG. 1 is an illustration showing aspects of an embedding-based product retrieval system of the present disclosure in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Retailers and other operators of ecommerce marketplaces often include search functionality on websites, apps and other platforms. The search functionality associated with the ecommerce marketplaces allows a user to enter a query to find items, services or other products on the ecommerce marketplace. The search functionality on the ecommerce marketplace can include a search bar or other user input tool to allow the user to type in a search string. Other examples can allow a user to use a voice input tool to input the search string. The search string often includes multiple words that are then searched against the catalog of items available on the ecommerce marketplace. The search tool can then return a list of items that are available on the ecommerce marketplace. The user can then select (e.g., click) the items in the search results listing to view or purchase the item.

Existing methods and apparatuses that are used in connection with search tools in existing systems often can return items in the search results that are not relevant to the search that is input by the user. When such items with limited relevance are returned, this interaction can frustrate the user and can lead to disengagement by the user. As a result, possible sales can be lost and the user may not revisit the ecommerce marketplace in the future. The methods and apparatuses of the present disclosure are improvements over existing methods and apparatuses because the methods and apparatuses of the present disclosure deliver search results that are more relevant to the initial search query initiated by the user. As a result, the website, app or other interface delivers a search result listing that displays items with a higher probability of being viewed and/or purchased by the user. Thus, the methods and apparatuses of the present disclosure can result in higher sales, increased revenues, increased user interaction, reduced drop rated of users, and increased profits.

The problems associated with many existing search methods and systems is that existing systems can use lexical matching in which the tokens in the user's search query are compared against tokens in item titles to determine a relevance between the query and the item. A token is a separable element in the search query or in the item title such as a word, number, symbol or the like. For example, in a search string that is entered by a user such as "running gear", the search can include two tokens "running" and "gear". The catalog of items can include various items with titles of different lengths. In this same example, the catalog of items can include many different items such as a type running shoe with the title "Brand X Model Y Running Shoes" and a book about running with the title "All About Running by Jane Doe". The running shoe title can include six tokens, "Brand", "X", "Model", "Y", "Running" and "Shoes." The book title can also include six tokens "All", "About", "Running", "by", "Jane", and "Doe". In existing systems, the tokens in the query can be compared against the tokens in the titles and then the search results can return items with the most matches. In the example above, both the running shoes and the running book include the work "running." Existing systems can rank these two items similarly in terms of relevancy since both items include one exact match. The book, however, is likely not the type of item that the user is interested in purchasing. This type of lexical match that is used by existing systems have these types of problems.

The present disclosure uses methods and apparatuses that can address these problems and instead can include a query encoder and an item encoder that can map the query and the item titles into a semantic space to determine the similarity between the query and the items to better determine a relevancy between the query and the items in the catalog.

Such a solution is illustrated in FIG. 1. In the example shown, the user query 102 is "running gear." This query 102 can be input into a query encoder 110 that can determine a query vector that can be projected into the semantic space 114. The semantic space 114 can be a natural language domain that can assist in capturing the meaning of the query rather than using a lexical matching process as previously described. For each item that is available in the catalog of items for an ecommerce marketplace, the items, such as item 104 and item 106, can be processed by the product retrieval systems of the present disclosure by processing them through an item encoder 112. The item encoder 112 can determine an item vector that is projected onto the semantic space 114. As further shown, the query 102 is projected into the semantic space 114 and is represented by query projection 116. The item 104 is projected onto the semantic space 114 and is represented by the projection 118 and the item 106 is projected onto the semantic space 114 and is represented by the projection 120. The distance between the projection 116 and the projection 118 and the distance between the projection 116 and the projection 118 can both be measured. The separation between the projections can correspond to a relevancy between the query and the items. As can be seen, the running shoe, item 104 with projection 118, is positioned closer to query 102 with projection 116 than the running book, item 106 with projection 120. As such, the product retrieval systems of the present disclosure can determine that the running shoe is more relevant to the user query than the running book. In this manner, more relevant search results can be returned to the user when the user enters a user query.

Figure 2:
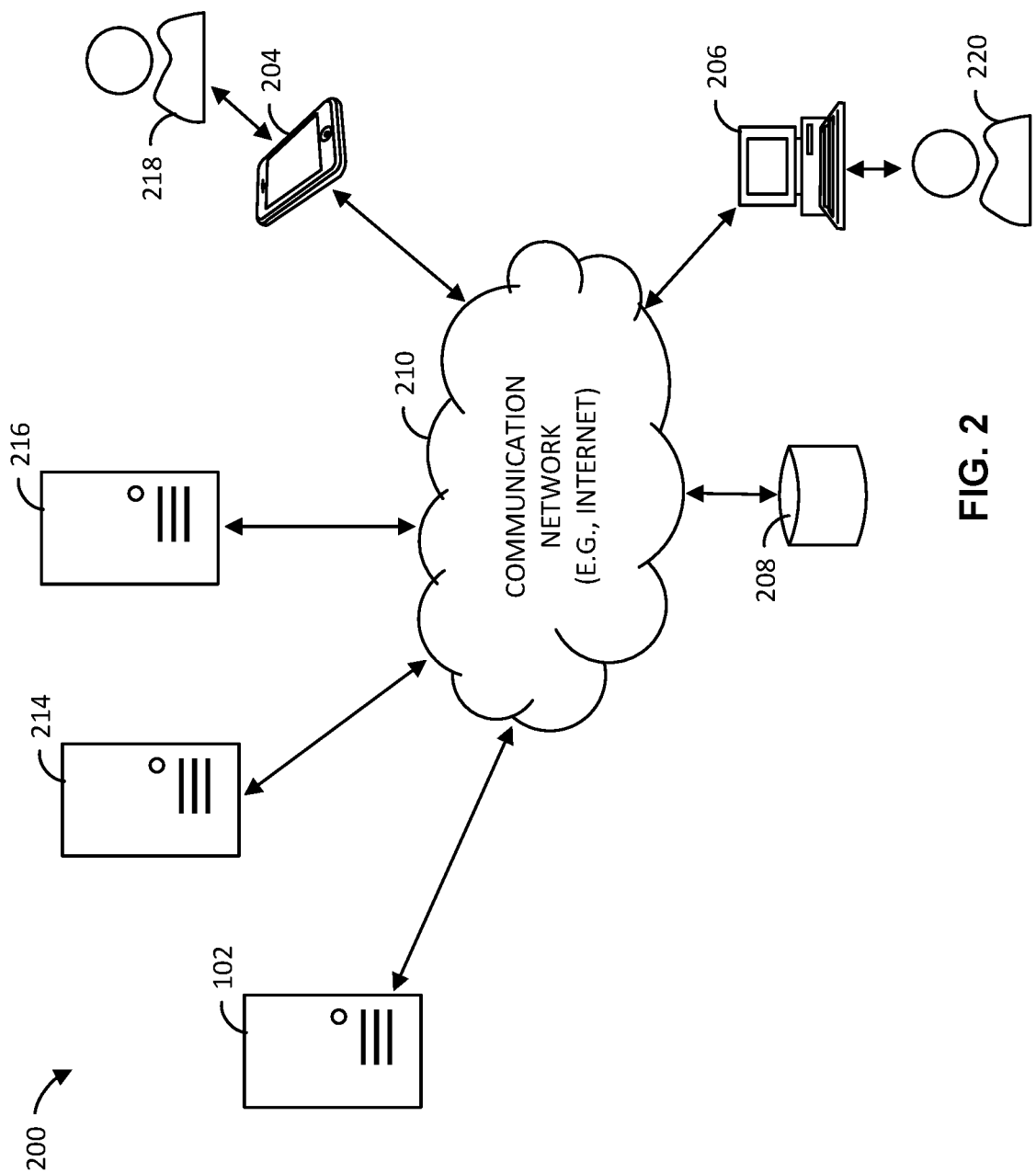
FIG. 2 is a block diagram showing an example product retrieval system of the present disclosure in accordance with some embodiments.

Turning to the drawings, FIG. 2 illustrates a block diagram of an example product retrieval system 200 that includes a retrieval computing device 202 (e.g., a server, such as an application server), a marketplace computing device 214, a legacy retrieval computing device 216 (e.g., a web server), a database 208, and multiple user computing devices 204, 206 operatively coupled over network 210. Retrieval computing device 202, marketplace computing device 214, legacy retrieval computing device 216, and multiple user computing devices 204, 206 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 210.

In some examples, retrieval computing device 202 can be a computer, a workstation, a laptop, a server such as a cloud-based server, or any other suitable device. In some examples, each of the multiple user computing devices 204, 206 can be a cellular phone, a smart phone, a tablet, a personal assistant device, a voice assistant device, a digital assistant, a laptop, a computer, or any other suitable device. In some examples, retrieval computing device 202 and the marketplace computing device 214 can be operated and/or controlled by a retailer, and multiple user computing devices 204, 206 are operated by users or customers.

The marketplace computing device 214 can be distributed among one or more workstations or servers that are coupled together over the network 210. The marketplace computing device 214 can cause an ecommerce marketplace to be displayed or otherwise communicated via one or more websites. The users 218, 220 can view, browse and order items that may be made available via the ecommerce marketplace as well as enter searches for product or items. The marketplace computing device 214 can collect information such as queries that are entered by customers as well as collect information regarding how customers interacted with the search results that are returned by the retrieval computing device 202. The marketplace computing device 214 can store such information and/or send such information for storage in the database 208 or in other components of the product retrieval system 200.

The legacy retrieval computing device 216 can also be distributed among one or more workstations or servers that are coupled together over the network 210. In other examples, the legacy retrieval computing device 216 can be a single computing device as shown. The legacy retrieval computing device 216 can include an existing product retrieval system or searching system that a retailer or other operator of an ecommerce marketplace may be using to delivery search results to the marketplace computing device 214 for display to the user. The legacy retrieval computing device 216, for example, can include a search system that is based on lexical matching as previously described. In other examples, the legacy retrieval computing device 216 can have other components and/or can perform other processes to deliver search results to the user. As will be further explained, the methods and apparatuses of the present disclosure can provide search results that can be blended with the search results of other retrieval systems, such as legacy retrieval computing device 216.

Retrieval computing device 202 can also be operable to communicate with database 208 over the communication network 210. The database 208 can be a remote storage device, such as a cloud-based server, a memory device on another application server, a networked computer, or any other suitable remote storage. Although shown remote to retrieval computing device 202, in some examples, database 208 can be a local storage device, such as a hard drive, a non-volatile memory, or a USB stick.

Communication network 210 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 210 can provide access to, for example, the Internet.

The user computing devices 204, 206 may communicate with the marketplace computing device 214 over communication network 210. For example, the marketplace computing device 214 may host one or more ecommerce marketplaces on one or more websites. Each of the user computing devices 204, 206 may be operable to view, access and interact with the websites hosted by the marketplace computing device 214. In some examples, the marketplace computing device 214 can allow a user 218, 220, via the user computing devices 204, 206, to browse, search and/or select products for purchase. As will be further explained, the marketplace computing device 214 can also personalize the websites through the display of the search results or through other personalized content via the user computing device 204, 206.

Figure 3:
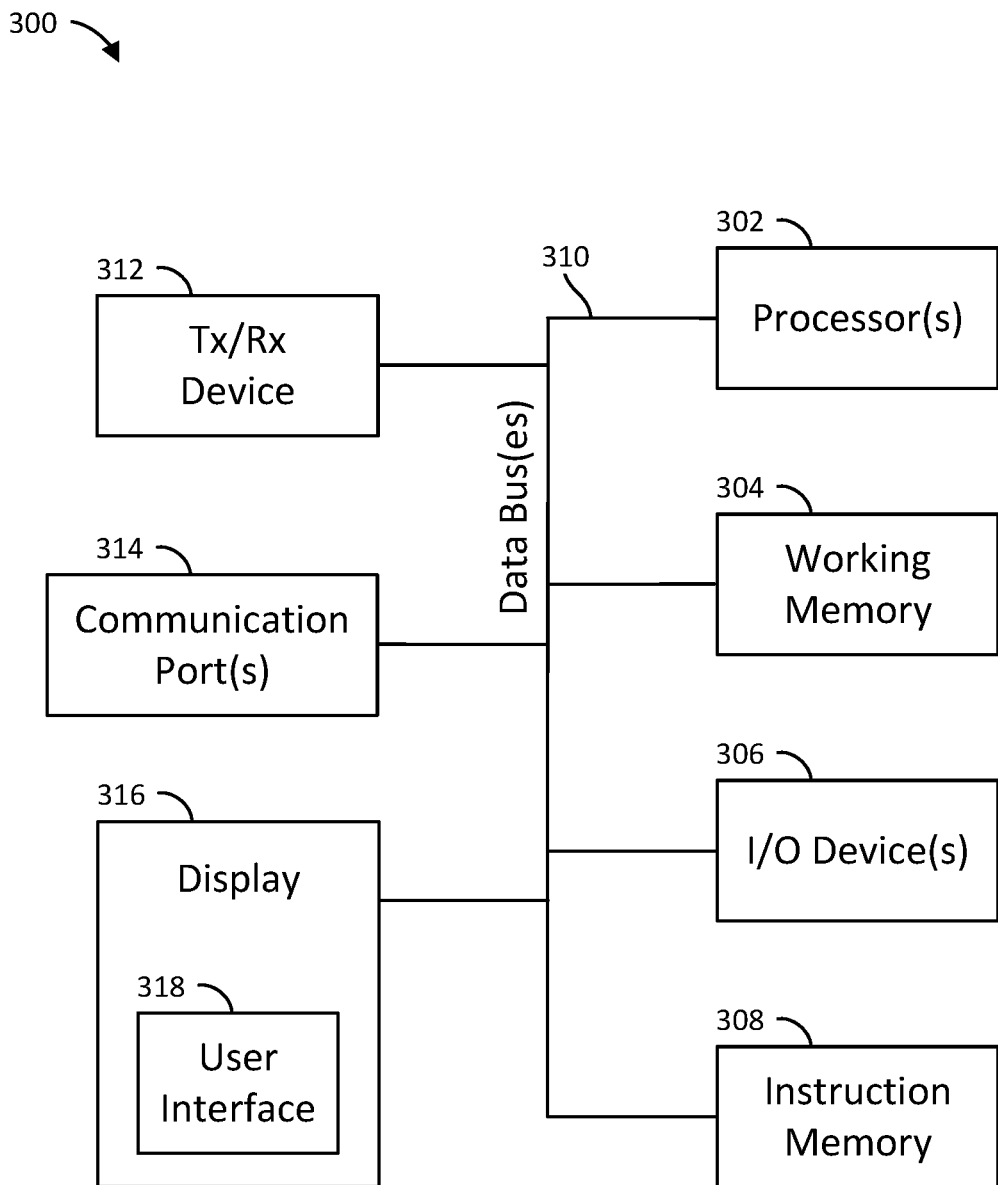
FIG. 3 is a block diagram of a computing device of the system of FIG. 1 in accordance with some embodiments.

FIG. 3 illustrates an example computing device 300. The retrieval computing device 202, the marketplace computing device 214, the legacy retrieval computing device 216, and/or the user computing devices 204, 206 may include the features shown in FIG. 2. For the sake of brevity, FIG. 2 is described relative to the retrieval computing device 202. It should be appreciated, however, that the elements described can be included, as applicable, in the marketplace computing device 214, the legacy retrieval computing device 216, and/or the user computing devices 204, 206.

As shown, the retrieval computing device 202 can be a computing device 300 that may include one or more processors 302, working memory 304, one or more input/output devices 306, instruction memory 308, a transceiver 312, one or more communication ports 314, and a display 316, all operatively coupled to one or more data buses 310. Data buses 310 allow for communication among the various devices. Data buses 310 can include wired, or wireless, communication channels.

Processors 302 can include one or more distinct processors, each having one or more cores. Each of the distinct processors can have the same or different structure. Processors 302 can include one or more central processing units (CPUs), one or more graphics processing units (GPUs), application specific integrated circuits (ASICs), digital signal processors (DSPs), and the like.

Processors 302 can be configured to perform a certain function or operation by executing code, stored on instruction memory 308, embodying the function or operation. For example, processors 302 can be configured to perform one or more of any function, method, or operation disclosed herein.

Instruction memory 308 can store instructions that can be accessed (e.g., read) and executed by processors 302. For example, instruction memory 308 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 302 can store data to, and read data from, working memory 304. For example, processors 302 can store a working set of instructions to working memory 304, such as instructions loaded from instruction memory 308. Processors 302 can also use working memory 304 to store dynamic data created during the operation of the retrieval computing device 202. Working memory 304 can be a random access memory (RAM) such as a static random access memory (SRAM) or dynamic random access memory (DRAM), or any other suitable memory.

Input-output devices 306 can include any suitable device that allows for data input or output. For example, input-output devices 306 can include one or more of a keyboard, a touchpad, a mouse, a stylus, a touchscreen, a physical button, a speaker, a microphone, or any other suitable input or output device.

Communication port(s) 314 can include, for example, a serial port such as a universal asynchronous receiver/transmitter (UART) connection, a Universal Serial Bus (USB) connection, or any other suitable communication port or connection. In some examples, communication port(s) 314 allows for the programming of executable instructions in instruction memory 308. In some examples, communication port(s) 314 allow for the transfer (e.g., uploading or downloading) of data, such as periodic sales data, periodic buyers data, periodic purchase data and the like.

Display 316 can display a user interface 318. User interfaces 318 can enable user interaction with the retrieval computing device 202. For example, user interface 318 can be a user interface that allows an operator to interact, communicate, control and/or modify different features or parameters of the retrieval computing device 202. The user interface 318 can, for example, display the performance of the retrieval computing device 202 and/or the search results using different textual, graphical or other types of graphs, tables or the like. In some examples, a user can interact with user interface 318 by engaging input-output devices 306. In some examples, display 316 can be a touchscreen, where user interface 318 is displayed on the touchscreen.

Transceiver 312 allows for communication with a network, such as the communication network 210 of FIG. 1. For example, if communication network 210 of FIG. 2 is a cellular network, transceiver 312 is configured to allow communications with the cellular network. In some examples, transceiver 312 is selected based on the type of communication network 210 retrieval computing device 202 will be operating in. Processor(s) 302 is operable to receive data from, or send data to, a network, such as communication network 210 of FIG. 2, via transceiver 212.

Figure 4:
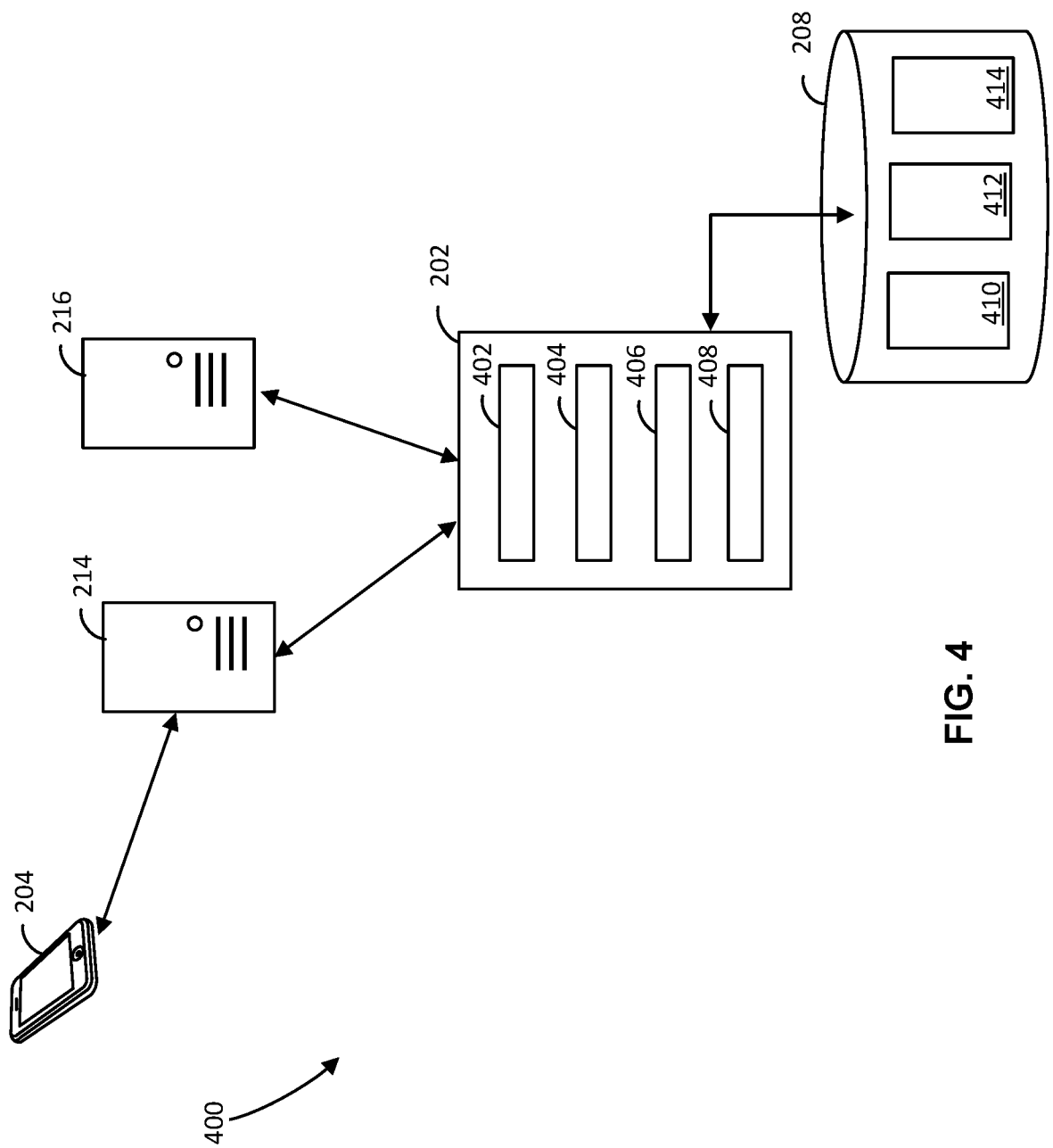
FIG. 4 is a block diagram showing an example retrieval computing device of the retrieval system of FIG. 2.

Turning now to FIG. 4, an example product retrieval system 400 is shown. The product retrieval system 400, in this example, includes retrieval computing device 202, marketplace computing device 214, legacy retrieval computing device 216, and database 208. The retrieval computing device 202 can be coupled to the marketplace computing device 214, the legacy retrieval computing device 216 and the database 208 using any suitable wired or wireless connection such as by network 210 previously described. The user computing device 204 can also be coupled to the marketplace computing device 214 and/or to the retrieval computing device 202.

The retrieval computing device 202 can include a feature generator 402, a query encoder 404, an item encoder 406, and a blending engine 408. The feature generator 402 can operate to obtain information such as query information and item information. Query information can include information that characterizes a query that is entered by a user. The item information can include information that characterizes an item that is available on the ecommerce marketplace. The item information can include the title of the item, taxonomy information (e.g., department, category, or other organizational information), the popularity of the item and the like. The feature generator 402 can also operate to obtain query-item pair information. Query-item pair information can be information that includes the content of the user's query (e.g., the words entered in the search string) and the item that was clicked or purchased after search results were displayed to the user. The query-item pair information can also include the popularity score the item that was clicked or purchased. In other examples, the feature generator 402 can obtain other information such as the ID of the user. This query information, the item information and the query-pair information can be obtained for any suitable time period. For example, this information can be obtained for the most recent year, for the most recent six months, for the most recent five months or for other suitable time period.

The feature generator 402 can also operate to tokenize a query and to tokenize a product title. The feature generator 402 can, for example, generate a vector from a search string by separating the search string into the individual words or other tokens. The feature generator 402 can use any suitable tokenization process including tokenizing the query into unigrams, bi-grams, or tri-grams, for example. The feature generator 402 can also partition the obtained data into training data, test data and development data. Each of these sets can be partitioned by a query.

The retrieval computing device 202 can also include the query encoder 404 and the item encoder 406. The query encoder 404 can operate to determine a query embedding to represent the query in a semantic space. The item encoder 406 can operate to determine an item embedding to represent the item in the semantic space. In one example, the query encoder 404 and the item encoder 406 can be built using a machine learning model (e.g., an embedding-based model) that can learn the query encoder and the item encoder. Any suitable open source or proprietary machine learning tool, library or algorithm can be used.

The retrieval computing device 202 can also include the blending engine 408. The blending engine 408 can operate to blend a list of search results that is determined by the retrieval computing device 202 and a list of search results that is determined by a legacy retrieval computing device 216. The blending engine 408 can be implemented using any suitable algorithm, rule or other model. In one example, one or more predetermined blending rules are used to blend the two lists of search results into a final set of search results that can be displayed or otherwise presented to the user.

The retrieval computing device 202 can also be coupled to the database 208. The retrieval computing device 202 can access various types and quantities of data from the database 208. The database 208 can include query information 410, item information 412 and popularity information 414. In addition, the final search results that are determined by the retrieval computing device 202 can also be stored in the database 208.

Figure 5:
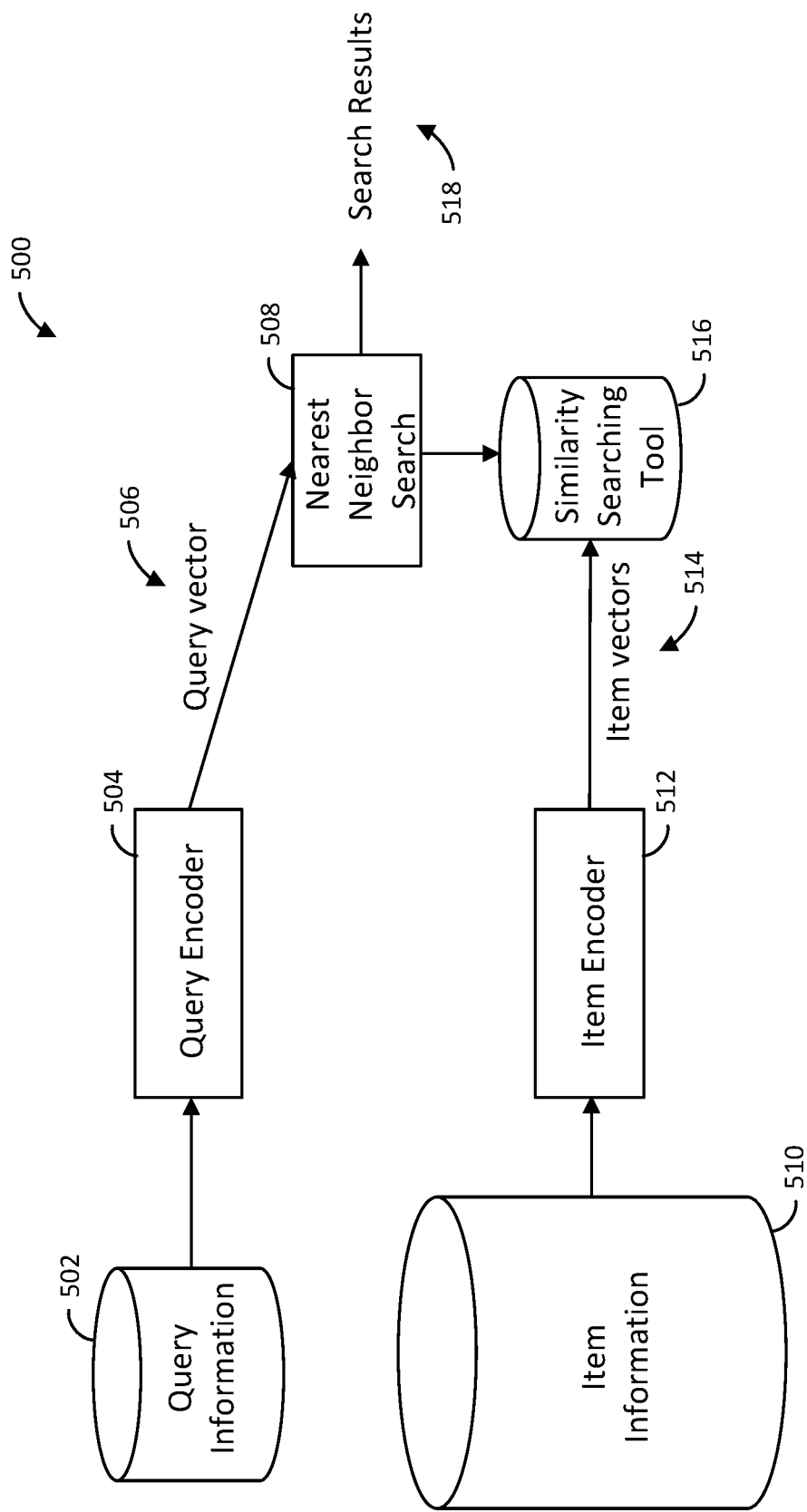
FIG. 5 is a block diagram showing an example architecture of a product retrieval system in accordance with some embodiments.

Referring now to FIG. 5, another example illustration of a product retrieval system 500 of the present disclosure is shown. As shown, the product retrieval system 500 can include a query encoder 504 that can determine a query vector 506 based on the query information 502. The query information 502 can be obtained, for example, by the feature generator 402 previously described. The feature generator 402 can filter, trim or otherwise process the query information 502 to make the query information more suitable for processing by the query encoder 504. In one example, the query information can include all queries that have been entered by a user during a predetermined period of time. The query information can be tokenized and then trimmed so that the query includes no more than a predetermined amount of tokens. In one example, the query information can be trimmed to include no more than one hundred tokens. In other examples, the query information can be trimmed to have other sizes.

As further shown, the product retrieval system 500 can also include the item encoder 512 that can determine an item vector 514 based on the item information 510. The item information 510 can be obtained, for example, by the feature generator 402 previously described. The product retrieval system 500 can then determine the search results 518 by performing a nearest neighbor search 508 between the query vector 506 and the item vector 514. The nearest neighbor search can be assisted by the use of a similarity searching tool 516 that can assist in classifying the item vectors 514 since the number of item vectors representing the number of items in the catalog of items available on the ecommerce marketplace can be very large. Any suitable similarity searching tool 516 can be used such as a Faiss Index or the like. The framework shown in FIG. 5 can be implemented as an offline process or can be implemented for real-time searching on the ecommerce marketplace.

Figure 6:
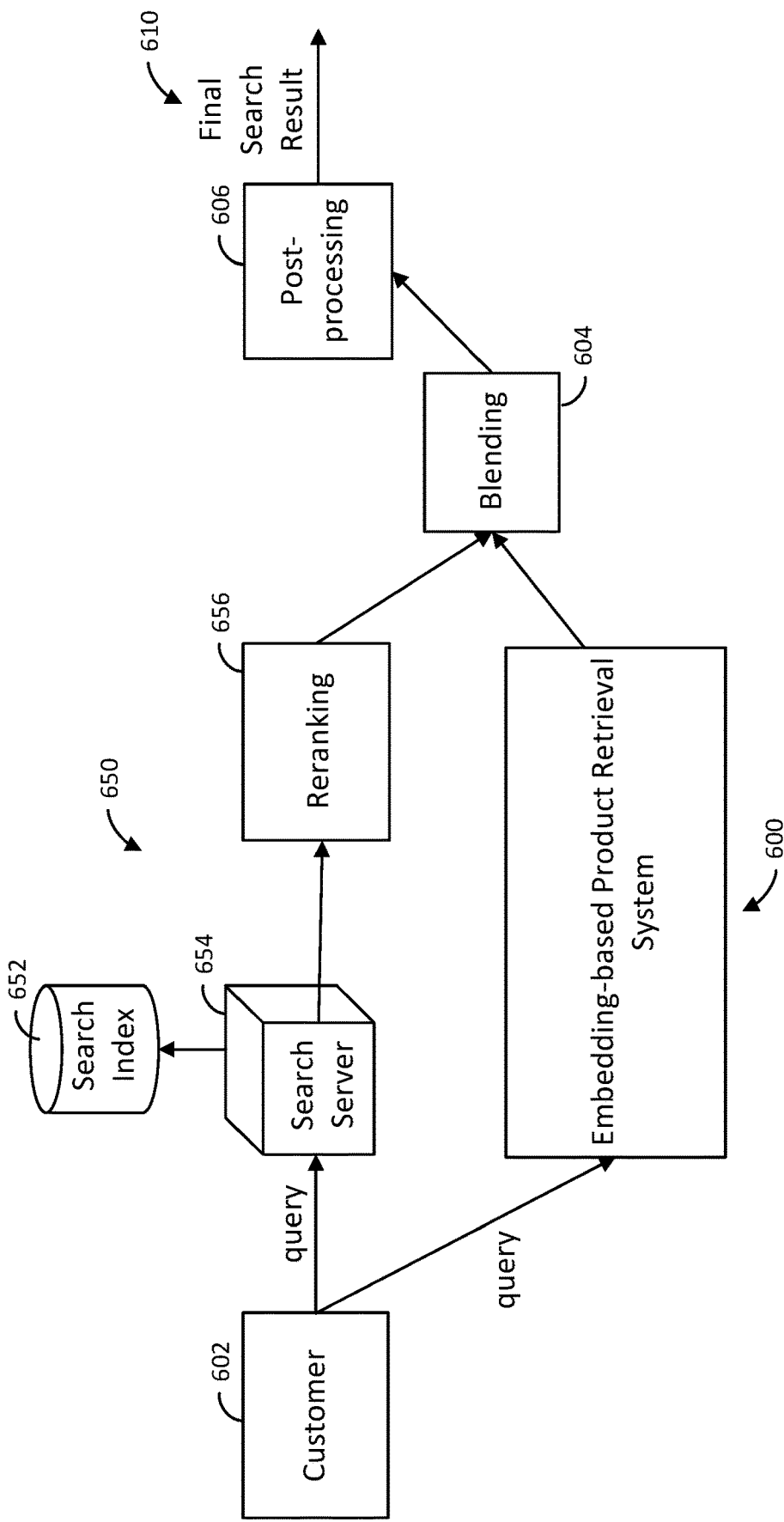
FIG. 6 is a block diagram showing and embedding-based product retrieval system of the present disclosure and its relationship to an example legacy retrieval system in accordance with some embodiments.

As previously described, the product retrieval systems of the present disclosure can be implemented to be used in connection with a legacy retrieval system that may currently be implemented by a retailer or other operator of the ecommerce marketplace. This integration can be accomplished by determining a second set of search results and then blending the second set of search results with the search results from the legacy retrieval system. Such a parallel process is illustrated in FIG. 6. As shown, the legacy retrieval system 650 can include, in one example, a search server 654 coupled to a search index 652. The legacy retrieval system 650 can receive a query from a customer 602. In response, the legacy retrieval system use the search server 654 and the search index 652 to retrieve legacy search results that can undergo re-ranking at 656. In operation prior to the addition of the embedding-based product retrieval system 600, the legacy retrieval system 650 would move directly to the post-processing step 606 and then display the search results to the customer. The legacy retrieval system 650 can include a lexical matching process of other existing product retrieval process.

In accordance with the methods and apparatuses of the present disclosure, the embedding-based product retrieval system 600 can be added in parallel to the legacy retrieval system 650. The embedding-based product retrieval system 600 can also receive the same query that is obtained by the legacy retrieval system 650. Using the methods and apparatuses as described herein, the embedding-based product retrieval system 600 can retrieve a second set of products that it determines to be relevant to the query of the customer 602. This second set of products (or second set of search results) can be blended with search results of the legacy retrieval system at the blending step 604. This blended set of products can then undergo post-processing at step 606 before being displayed or otherwise presented to the customer as the final search result 610.

As previously stated, the determination of the second set of search results by the embedding-based product retrieval system 600 can be performed offline or in real time. In one implementation, the processing of the embedding-based product retrieval system 600 can be performed offline. In such an example, shown in FIG. 7, the embedding model 702 and the blending model (as will be further described below) can be trained offline. For example, the query-item data pairs and the item information can be collected and used to train the embedding model. The trained model can then be implemented to generate a query-item list. The query-item list can determine items to return as relevant search results when a query is entered by a customer. The query-item list can, for example, be generated for a predetermined number of the most common or most popular queries that are entered by a customer. In one example, the embedding model 702 can be trained and used to determine a query-item list that includes relevant search results for two million of the most common or most popular queries entered by a customer. In other examples, the embedding model 702 can be used to determine other sizes of the query-item list.

The blending model 704 can determine position information that determines a position that a search result should be positioned in the list of products that are returned to a customer in response to an entered query (e.g., search results). The position information can determine a position of a retrieved item relative to the position of items that are retrieved by a legacy retrieval system, such as legacy retrieval system 650. The blending model 704 can be trained using engagement data that can characterize customer's engagement with a product that is displayed or otherwise presented to customer in response to a customer's query. For example, the engagement data can characterize whether a customer clicks or otherwise selects a product from the presented search results. The blending model 704 can be trained and then implemented offline to determine the position data for the various items that may be retrieved as a relevant item in the query-item list.

Both the query-item list and the position information can be stored in a datastore, such as in database 208. The latest or the most recently determined query list and the position information can be stored in the datastore on periodic basis. For example, the query list and the position information can be stored on a monthly, weekly or daily basis. In other examples, the query list and the position can be stored in other periodic periods.

The retrieved products as included in the query-item list can be presented to customer at the presentation step 708. The retrieved products can, for example, be inserted into the retrieved products that can be determined by a legacy retrieval system. The items included in the query-item list can be inserted and positioned in the search results of the legacy retrieval system at a position as determined by the position information. As such, the new items (i.e., the items included in the query-item list) can be blended with the legacy items that are retrieved by the legacy retrieval system. The presentation step 708 can be a real-time or run-time process that is performed when a customer enters a query on the ecommerce marketplace, for example.

Figure 7:
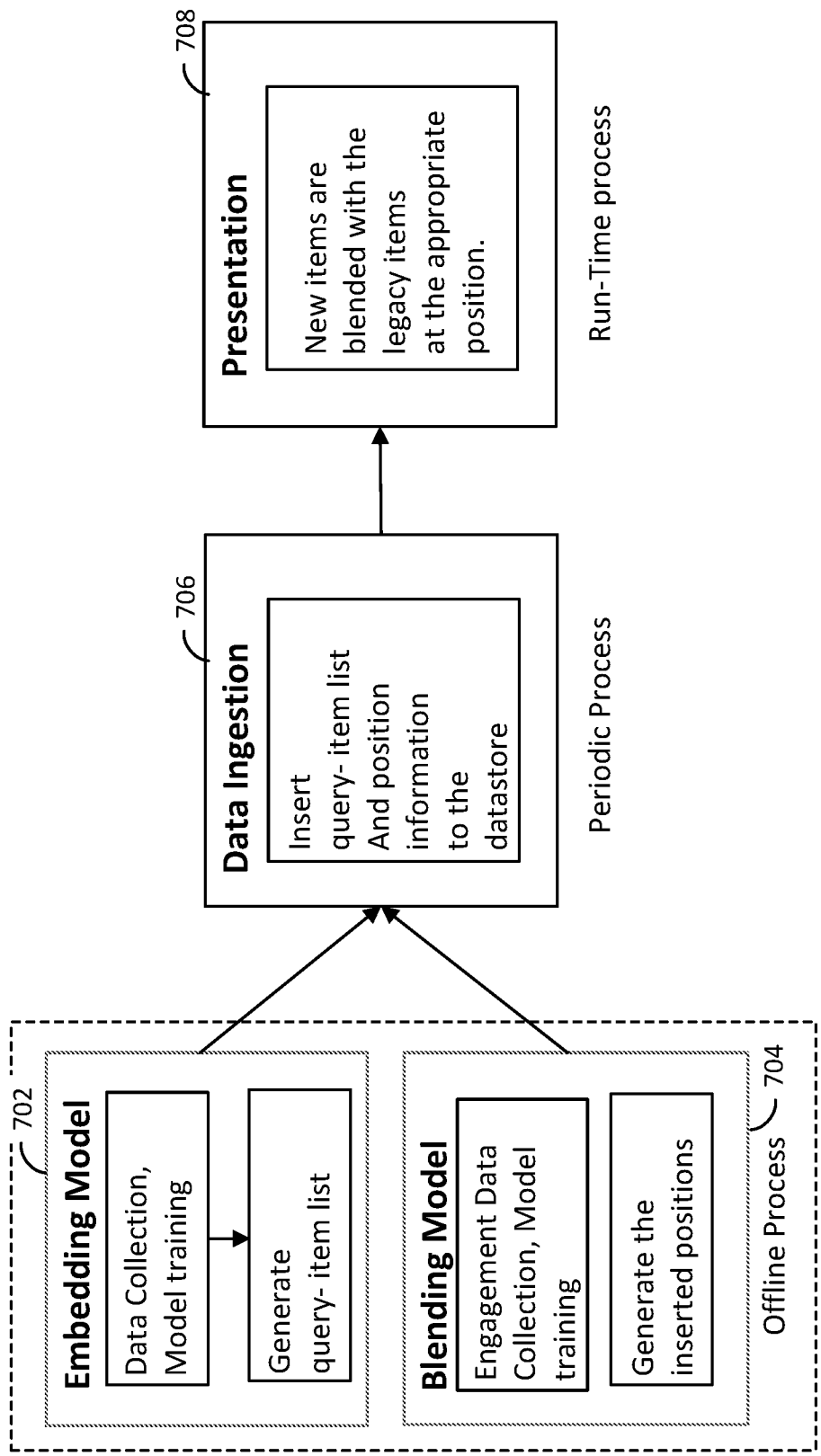
FIG. 7 is block diagram showing an example embedding-based product retrieval system implemented in an offline process in accordance with some embodiments.

In other examples, the process as shown in FIG. 7 can be performed in real-time. Once the embedding model 702 and the blending model are trained, the embedding model 702 and the blending model 704 can be implemented in a real-time process to return new items that are relevant to a customer's query and return position information indicating a position for the new items to be blending with the legacy items returned by the legacy retrieval system. In such a manner, the embedding-based retrieval systems of the present disclosure can be operated in real-time on an ecommerce marketplace.

As previously described, the retrieval computing device 202 can include one or more models to perform the product retrieval in response to a customer's query. The models that may be included in the retrieval computing device 202 can include, for example, the embedding model 702 and the blending model 704. Any suitable training methods can be used to train the embedding model 702 and/or the blending model 704.

Figure 8:
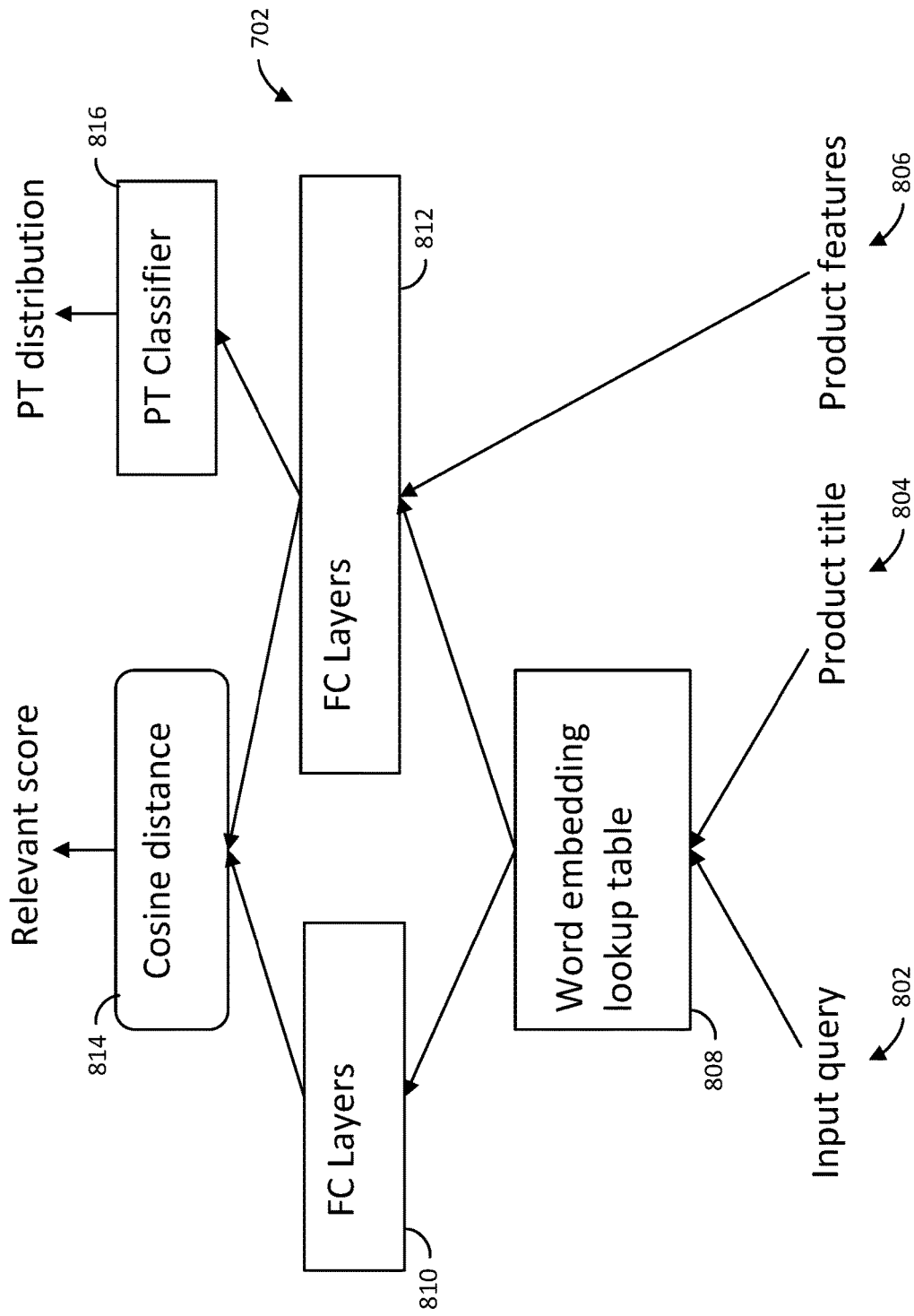
FIG. 8 is a block diagram showing an example modeling architecture of an embedding model in accordance with some embodiments.

In one example, the embedding model 702 can be built and training using deep learning method and techniques. As shown in FIG. 8, and example architecture is shown that can be used to train the embedding model. In this example, the embedding model 702 can be trained using query-item pairs that can be obtained by the feature generator 402 previously described. In addition, the feature generator 402 can obtain one or more product features. A product feature can be any suitable characteristic of a product. In the example shown, the product type is used as a feature. The product type can be category, class or department that the retailer uses to classify the product. Other product features that can be used in other examples include product price, product popularity, product rating, product reviews and the like.

After the query information, the item information and the product information is obtained. Engagement data for the query-item pairs can be obtained. The engagement data can identify if (or an amount of times) a customer selected or clicked the paired item based on the paired query. Legacy retrieval system pair data can also be obtained for the query-item pairs. The legacy retrieval system pair data can determine if the legacy retrieval system that can be operated in parallel with the embedding-based product retrieval system returned the particular item in response to the pair query. The query-item pairs can be labelled with this engagement data and/or the legacy retrieval system pair data using an engagement score. Any range of scores can be used. In one example, the query-item pairs can be labelled with a score between 0 and 31. In other examples, other ranges can be used.

A predetermined engagement criteria can be used to label the query-item pairs. In one example, the query-item pairs can be labelled as follows. An engagement score between 31 to 21 can be assigned to query-item pairs that the engagement data indicates that a customer actually clicked on or selected the item when it was presented to the user in a listing of search results. An engagement score between 20 and 1 can be assigned to user-item pairs in which the legacy retrieval system pair data indicates that the legacy retrieval system returned the item as a search result using the legacy retrieval system. An engagement score of 0 can be assigned to user-item pairs that do not meet either of the previous engagement criteria. These items with and engagement score of 0 can be considered to be little or no relevancy to the query. As can be seen, the items given the highest engagement scores are those items that have been observed to have been actually selected by a customer when presented with the item in response to the query. The next highest engagement scores are given to those items that may have been returned by a lexical matching or other legacy retrieval system. Lastly, the items that customers have not selected and do not have relevancy under lexical matching or other relevancy matching is given the lowest engagement score. As previously described, product type data can also be collected for the items in the query-item pairs. This product type information can be associated with the query-item pairs that have been labelled with the engagement scores. In other examples, other engagement criteria can be used to label the query-item pair information.

The embedding model 702 can be trained using multiple loss functions. The embedding model 702 can be trained both by determining a relevancy of the item to the query using a similarity or distance such as cosine similarity. The embedding model 702, in addition to relevancy, can be trained using a prediction score that determines the probability that the item should be assigned to the given product type. The embedding model 702 can be trained, in one example, to maximize the distribution of picking the most relevant item given a query. The relevancy can be determined using the cosine distance between the query and the item as described in Equation 1 below.

$$\text{logit(query,item)} = \exp(\text{cosine\_distance}(f(\text{query}), g(\text{title, features})))  \qquad \text{Equation 1}$$

The item distribution can be defined using Equation 2 and Equation 3 below, where $s(\text{item}^{((i))})$ is the engagement score previously described.

$$p(\text{query, item}^{(i)}) = \frac{\text{logit(query, item}^{(i)})}{\sum \text{logit(query, item}^{(k)})} \qquad \text{Equation 2}$$

$$\text{loss(query, item}^{(1)}, \text{item}^{(2)}, \ldots, \text{item}^{(n)}) = \qquad \text{Equation 3}$$
$$\sum_i (P(\text{query, item}^{(i)}) * \text{score(item}^{(i)}))$$

The embedding model 702 can also be trained using a probability that the model picks the correct product type that the item belongs in. The embedding model 702 can be trained using a loss function as defined below in Equation 4, where $f(\text{item}^{(i)}, \text{pt}^{(j)})$ is the prediction score from the embedding model that indicates how much the item should be assigned to the given product type (a higher score is better).

$$\text{loss}(\text{item}^{(i)}, pt^{(j)}) = -f(\text{item}^{(i)}, pt^{(j)}) + \log(\Sigma_k \exp(f(\text{item}^{(i)}, pt^{(k)})))$$

Equation 4

As shown in FIG. 8, this general methodology of the modeling of the embedding model 702 is shown. As shown, input query information 802, product title information 804 and product feature information 806 can be obtained and used to train and implement the embedding model 702. A word embedding lookup table 808 can be used, for example, that can include the query-item pair information previously described. The word embedding lookup table 808 can include information that assigns one token to a word vector. For example, if the input query is "running shoes." The input query can be converted to a list of token identifier, e.g., [10, 15], where 10 represents "running" and 15 represents "shoes." The token identifiers can then be used to obtain the word vectors associated with each token identifier. In this example, the word embedding lookup table 808 can be used to obtain the word vectors associated with the token identifiers [10, 15] to obtain the word vectors for "running" and "shoes." The word vectors can then be further processed.

The input query information 802 and the product title information 804 can be tokenized and/or otherwise processed and compared to the contents of the word embedding lookup table 808. The corresponding query-item pair information and/or the corresponding query embeddings and/or the item embeddings can be input into a first set of fully connected (FC) layers 810 and into a second set of FC layers 812 of a convolutional neural network. In one example, the input to the FC layers 810 and the FC layers 812 can be the sum of all word vectors that are returned from the word embedding lookup table 808. The input to the FC layers 810 and FC layers 812 can be the same. In the example shown, the input to the FC layers 812 also can include the product features 806. In one example, the product features 806 can include a popularity score. In other example, the product features 806 can include other characteristics of the item such as product rating, product brand and the like.

The embedding model 702 can then use a cosine distance 814 and a product type (PT) classifier 816 to determine a relevancy score and a product type (PT) distribution. This information can, in turn, be used to determine and/or rank items to be returned as relevant items to the original input query 802. The details in FIG. 8 show one example implementation of the embedding model 702. The details previously described and shown in FIG. 8 can be used in one example to train the embedding model 702. Once the embedding model 702 is trained, the embedding model 702 can be used to determine the query and item vectors. In such an example, a nearest neighbor search on the generated vectors to determine a ranked list of relevant items to return in response to the query. Any suitable software, methodology, algorithm or library can be used to perform the nearest neighbor search such as FAISS. In other examples, other machine learning, neural networks and deep learning can be used using open source or proprietary software, applications, tool or libraries.

As previously discussed, the embedding model 702 can be used to determine a relevancy and/or to rank items in terms of relevancy to the input query. Once this ranked list of items is determined, the ranked list of items can be blended with the ranked list of items that is returned by the legacy retrieval system. In one example, a blending model 704 can be used. The blending model can be a trained machine learning model that can learn whether an item should be presented to the customer relative to the item returned by the legacy retrieval system. In one example, click data can be used to determine a position of the returned items. Click data can be data that indicates the amount of times that a customer clicked on the item when the item was presented to a customer. This click data can be returned for the most recent seven day period and for the most recent fourteen day period. The click data from these two periods can be compared. If the click data shows more engagement (i.e. more clicks) in the most recent seven days versus the most recent fourteen days, the item with such increased engagement can be moved up (or promoted) in the list of items. If the click data shows less engagement (i.e., less clicks) in the most recent seven days versus the most recent fourteen days, the item with such decreased engagement can be moved down (or demoted) in the list of items. This example uses two time periods that are seven and fourteen days. In other examples, other time periods can be used.

It may be the case that the click data can be sparse in that there may not be very many query-item pairs that have click data that is non-zero. In such instances, it can be difficult to compare the two different distributions of data between the two different time periods. In instances of data sparsity in the click data, the item's category can also be used. In such instances, all items that are in a particular category can be compared using click data and all items in those categories can be promoted or demoted together.

In one example, the embedding-based product retrieval system can return a list of the top ten most relevant items for a given query. In parallel, the legacy retrieval system can return a list of its highest matching top ten items. The blending model 704 can include a default condition in which the legacy returned items are listed as items 1 to 10 and the embedding-based returned items are listed as item 11 to 20. The blending model can promote or demote the embedding-based returned items as previously described using the click data. In such a manner, depending on the actual engagement of the items as demonstrated by the click data the embedding-based returned items can move up the list of returned items. In other examples, other default conditions can be used.

Figure 9:
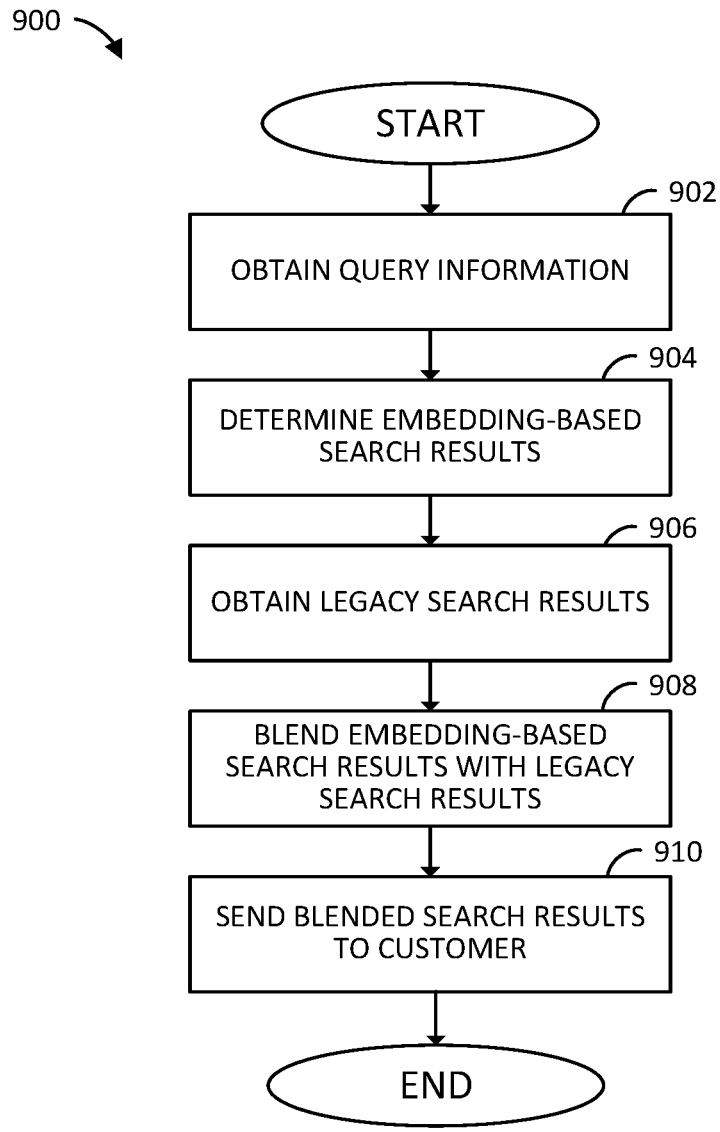
FIG. 9 is a flowchart showing an example method of retrieving embedding-based search results in accordance with some embodiments.

Referring now to FIG. 9, a method 900 of retrieving relevant items in response to a customer query is shown. The method 900 can be implemented by the embedding-based retrieval systems described above. Suitable apparatuses that can perform one or more steps of the method 900 include the product retrieval system 200, the retrieval computing device 202, product retrieval system 400, product retrieval system 500 and embedding-based product retrieval system 600. The method 900 is described below with reference to the product retrieval system 400 but it should be appreciated that such description does limit the implementation of the method 900 to any particular system or apparatus.

The method 900 begins at step 902. At step 902, the feature generator 402 can obtain query information. The query information can be data that characterizes a query entered by a customer on an ecommerce marketplace. The query information can include, for example, the text string entered by the customer. While not shown, the feature generator 402 can obtain other information and can perform other operations such as tokenizing the query information and/or like as previously described.

The method continues to step 904. At step 904, the retrieval computing device 202 can determine embedding-based search results. For example, the retrieval computing device 202 can include an embedding-based machine learning model such as embedding model 702 previously described. The retrieval computing device 202 can determine a ranked list of items that it has determined are most relevant to the query entered by the customer. In one example, the list of items can include ten items ranked by the relevance to the query.

The method 900 can then continue to step 906. At step 906, the retrieval computing device 202 can obtain legacy search results. The legacy search results can be a list of items that are returned by a legacy retrieval system such as legacy retrieval system 650 (FIG. 6). The legacy search results can return a list of items that the legacy search results has determined are relevant to or match the query input by the customer. The legacy retrieval system can operate in parallel or concurrently with the retrieval computing device 202 in some examples. The legacy search results can be list of ten items similar to the embedding-based search results returned at step 904.

At step 908, the retrieval computing device 202 can then blend the embedding-based search results with the legacy search results. The retrieval computing device 202 can for example, use the blending engine 408 and/or the blending model 704 previously described to blend the embedding-based search results with the legacy search results. The retrieval computing device 202 can, for example, position the embedding-based search results relative to the legacy search results based on click data that indicates a recent engagement of the customer with the items returned in the embedding-based search results. In other examples, other blending criteria can be used.

At step 910, the retrieval computing device 202 can send the blended search results to the customer. The retrieval computing device 202 can send the blended search results to the customer using any suitable process or communication method. In one example, the blended search results can be sent to the marketplace computing device 214 that can display the search results to the customer on the customer's computing device. In other examples, the search results can be sent to the customer using other interface elements and/or processes.

Figure 10:
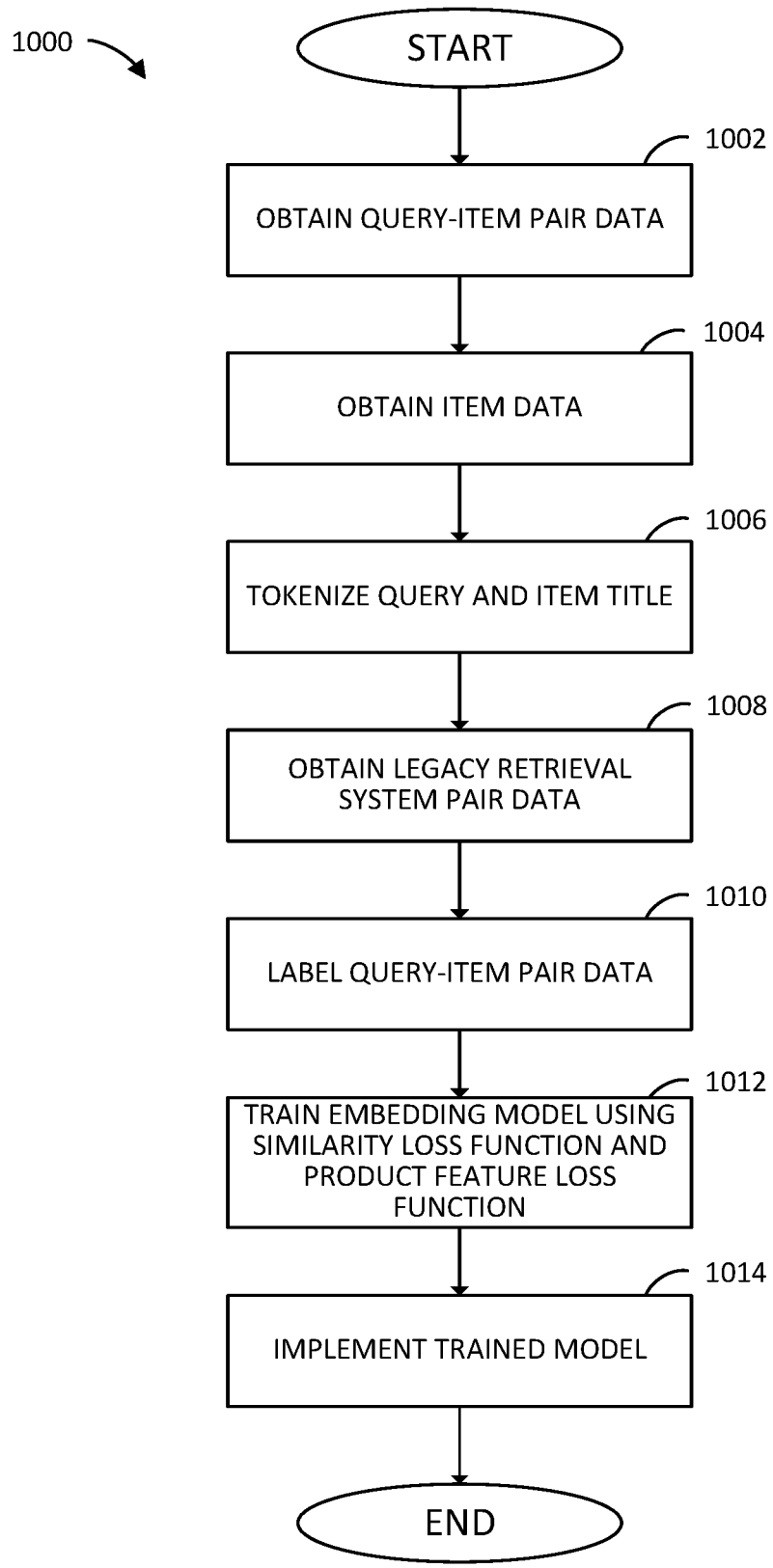
FIG. 10 is a flow chart illustrating an example method of training an embedding-based model in accordance with some embodiments.

The methods and apparatuses of the present disclosure also contemplate a method of training an embedding-based model that can be used in a product retrieval system. An example training method 1000 is shown in FIG. 10. The method 1000 begins at step 1002. At step 1002, query-item data can be obtained. For example, the feature generator 402 can obtain query-item data pairs.

At step 1004, item data can be obtained. The item data can include product features that can characterize one or more characteristics of the items that are available on an ecommerce marketplace. The product features can include, for example, product type, product price, product ratings, product reviews, or other characteristics of the items.

At step 1006, the query and the item title can be tokenized. The query and the item title can be tokenized using any suitable method to separate the query and the item title into individual tokens such words or other tokens. While not shown, the query and the item title can also be trimmed or otherwise simplified to reduce the amount of tokens or limit the amount of tokens in each query and item title.

At step 1008, legacy retrieval system pair data can be obtained. The legacy retrieval system pair data can include information that can indicate which items are returned as being relevant to a particular query by a legacy retrieval system. The legacy retrieval system can be an existing retrieval system that is in operation by the retailer.

At step 1010, the query-item pair data can be labelled. The labelling that can occur at step 1010 can be an indication of how likely the item is relevant to the query. In one example, an engagement score can be used to make this determination. The engagement score can be based on engagement data (i.e., data that indicates whether a customer clicked on the item when the item was returned in a list of search results) and/or on the legacy retrieval system pair data. As previously described, the engagement score can be a numerical score such as a number between 0 and 31. In other examples, the query-item pairs can be labelled using other methods.

At step 1012, the embedding model can be trained using a similarity loss function and a product feature loss function. For example, the embedding model can be trained using a similarity loss function such as that described above in Equation 3 and the product feature loss function such as that described above in Equation 4. In other examples, other similarity loss functions and other product feature loss functions can be used.

At step 1014, the embedding model can be implemented. The embedding model can be implemented in an offline process or can be implemented in a real-time process as previously described. The embedding model can also be implemented in an embedding-based product retrieval system that can operate in parallel with a legacy retrieval system.

The foregoing examples focused on descriptions of the principles and teachings of the present disclosure used in the context of a retailer and an ecommerce marketplace. As can be appreciated, the methods and apparatuses described herein can be applied in various contexts and in various industries. The method and apparatuses of the present disclosure can be used to provide search results in other contexts, other industries and in other environments such as in the financial services, health services and other industries as well.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a non-transitory memory configured to store instructions thereon and a processor which is configured by the instructions to:
obtain query information characterizing a query initiated by a customer on an ecommerce marketplace;
determine embedding-based search results comprising a first list of items, wherein the embedding-based search results are determined using a trained embedding-based machine learning model configured to use a cosine similarity and a prediction score, wherein the cosine similarity is defined as:

$$\text{logit}(\text{query},\text{item})=\exp(\text{cosine\_distance}(f(\text{query}),g(\text{title},\text{features})))$$

where item is each item in the first list of items, title is a title of the item, and features is one or more features of the item and wherein the embedding-based machine learning model is trained using a training method comprising:
obtaining query-item pair data comprising queries and item titles;
tokenizing the queries and the item titles in the query-item pair data;
labelling each query-item pair in the query-item pair data using an engagement score; and
training the embedding-based machine learning model using the cosine similarity function and the product feature loss function; and
obtain legacy search results comprising a second list of items;
blend the embedding-based search results with the legacy search results to obtain blended search results, wherein the blended search results are blended using one or more blending criteria that characterizes engagement by customers with the items in the first list of items; and
send the blended search results to the customer.

2. The system of claim 1, wherein a relative position of the items in the first list of items relative to the items in the second list of items in the blended search results is determined by comparing an engagement of the customer with each item in a recent time period with an engagement of the customer with each item prior to the recent time period.

3. The system of claim 1, wherein the processor is operated in parallel with a legacy retrieval system that is configured to return the legacy search results.

4. A method comprising:
obtaining query information characterizing a query initiated by a customer on an ecommerce marketplace;
determining embedding-based search results comprising a first list of items, wherein the embedding-based search results are determined using a trained embedding-based machine learning model configured to use a cosine similarity and a prediction score, wherein the cosine similarity is defined as:

$$\text{logit}(\text{query},\text{item})=\exp(\text{cosine\_distance}(f(\text{query}),g(\text{title},\text{features})))$$

where item is each item in the first list of items, title is a title of the item, and features is one or more features of the item and wherein the embedding-based machine learning model is trained using a training method comprising:
obtaining query-item pair data comprising queries and item titles;
tokenizing the queries and the item titles in the query-item pair data;
labelling each query-item pair in the query-item pair data using an engagement score; and
training the embedding-based machine learning model using the cosine similarity function and the product feature loss function; and
obtaining legacy search results comprising a second list of items;
blending the embedding-based search results with the legacy search results to obtain blended search results, wherein the blended search results are blended using one or more blending criteria that characterizes engagement by customers with the items in the first list of items; and
sending the blended search results to the customer.

5. The method of claim 4, wherein a relative position of the items in the first list of items relative to the items in the second list of items in the blended search results is determined by comparing an engagement of the customer with each item in a recent time period with an engagement of the customer with each item prior to the recent time period.

6. The method of claim 4, wherein the method is performed in parallel with a legacy retrieval system that is configured to return the legacy search results.

7. A non-transitory computer readable medium having instructions stored thereon, wherein the instructions, when executed by at least one processor, cause a device to perform operations comprising:
obtaining query information characterizing a query initiated by a customer on an ecommerce marketplace;
determining embedding-based search results comprising a first list of items, wherein the embedding-based search results are determined using a trained embedding-based machine learning model configured to use a cosine similarity and a prediction score, wherein the cosine similarity is defined as:

$$\text{logit}(\text{query},\text{item})=\exp(\text{cosine\_distance}(f(\text{query}),g(\text{title},\text{features})))$$

where item is each item in the first list of items, title is a title of the item, and features is one or more features of the item and wherein the embedding-based machine learning model is trained using a training method comprising:

obtaining query-item pair data comprising queries and item titles;

tokenizing the queries and the item titles in the query-item pair data;

labelling each query-item pair in the query-item pair data using an engagement score; and training the embedding-based machine learning model using the cosine similarity function and the product feature loss function; and obtaining legacy search results comprising a second list of items;

blending the embedding-based search results with the legacy search results to obtain blended search results, wherein the blended search results are blended using one or more blending criteria that characterizes engagement by customers with the items in the first list of items; and sending the blended search results to the customer.

8. The non-transitory computer readable medium of claim 7, wherein a relative position of the items in the first list of items relative to the items in the second list of items in the blended search results is determined by comparing an engagement of the customer with each item in a recent time period with an engagement of the customer with each item prior to the recent time period.

9. The non-transitory computer readable medium of claim 7, wherein the operations are performed in parallel with a legacy retrieval system that is configured to return the legacy search results.

10. The system of claim 1, wherein the prediction score is determined by a product feature loss function defined as:

$$\text{loss}(\text{query}, \text{item}^{(1)}, \text{item}^{(2)}, \ldots, \text{item}^{(n)}) = \Sigma_i(P(\text{query}, \text{item}^{(i)}) * \text{score}(\text{item}^{(i)}))$$

where $$p(\text{query}, \text{item}^i) = \frac{\text{logit}(\text{query}, \text{item}^{(i)})}{\sum \text{logit}(\text{query}, \text{item}^{(k)})}$$

and where $\text{score}(\text{item}^{(i)})$ is an engagement score.

11. The system of claim 1, wherein a loss function of the trained embedding-based machine learning model comprises:

$$\text{loss}(\text{item}^{(i)}, pt^{(j)}) = -f(\text{item}^{(i)}, pt^j) + \log(\Sigma_k \exp(f(\text{item}^{(i)}, pt^{(k)})))$$

12. The method of claim 4, wherein the prediction score is determined by a product feature loss function defined as:

$$\text{loss}(\text{query}, \text{item}^{(1)}, \text{item}^{(2)}, \ldots, \text{item}^{(n)}) = \Sigma_i(P(\text{query}, \text{item}^{(i)}) * \text{score}(\text{item}^{(i)}))$$

where $$p(\text{query}, \text{item}^i) = \frac{\text{logit}(\text{query}, \text{item}^{(i)})}{\sum \text{logit}(\text{query}, \text{item}^{(k)})}$$

and where $\text{score}(\text{item}^{(i)})$ is an engagement score.

13. The method of claim 4, wherein a loss function of the trained embedding-based machine learning model comprises:

$$\text{loss}(\text{item}^{(i)}, pt^{(j)}) = -f(\text{item}^{(i)}, pt^j) + \log(\Sigma_k \exp(f(\text{item}^{(i)}, pt^{(k)})))$$

14. The non-transitory computer readable medium of claim 7, wherein the prediction score is determined by a product feature loss function defined as:

$$\text{loss}(\text{query}, \text{item}^{(1)}, \text{item}^{(2)}, \ldots, \text{item}^{(n)}) = \Sigma_i(P(\text{query}, \text{item}^{(i)}) * \text{score}(\text{item}^{(i)}))$$

where $$p(\text{query}, \text{item}^i) = \frac{\text{logit}(\text{query}, \text{item}^{(i)})}{\sum \text{logit}(\text{query}, \text{item}^{(k)})}$$

and where $\text{score}(\text{item}^{(i)})$ is an engagement score.

15. The non-transitory computer readable medium of claim 7, wherein a loss function of the trained embedding-based machine learning model comprises:

$$\text{loss}(\text{item}^{(i)}, pt^{(j)}) = -f(\text{item}^{(i)}, pt^j) + \log(\Sigma_k \exp(f(\text{item}^{(i)}, pt^{(k)})))$$

16. The non-transitory computer readable medium of claim 15, wherein embedding-based machine learning model is trained using a training method comprising:

obtaining query-item pair data comprising queries and item titles;

tokenizing the queries and the item titles in the query-item pair data;

labelling each query-item pair in the query-item pair data using an engagement score; and training the embedding-based machine learning model using the cosine similarity function and the product feature loss function.

\* \* \* \* \*